United States Patent
Fraser et al.

(10) Patent No.: US 6,993,351 B2
(45) Date of Patent: Jan. 31, 2006

(54) METHOD AND SYSTEM FOR COMMUNICATING WITH A QUIESCENT MOBILE VEHICLE

(75) Inventors: Ronald W. Fraser, Lake Orion, MI (US); John J. Correia, Livonia, MI (US); Dwayne A. Crocker, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 511 days.

(21) Appl. No.: 10/011,689

(22) Filed: Dec. 7, 2001

(65) Prior Publication Data

US 2003/0109268 A1 Jun. 12, 2003

(51) Int. Cl.
*H04M 3/00* (2006.01)
(52) U.S. Cl. .................. 455/466; 455/419; 455/420; 370/395.4
(58) Field of Classification Search .............. 455/466, 455/569.2, 404, 418–420, 343.4; 340/573.1, 340/573.4, 7.1–7.23, 7.29, 7.33; 701/1, 2, 701/36, 24, 29; 370/395.4
See application file for complete search history.

(56) References Cited

U.S. PATENT DOCUMENTS

| | | | |
|---|---|---|---|
| 5,717,387 A * | 2/1998 | Suman et al. .................. 701/36 |
| 5,797,094 A * | 8/1998 | Houde et al. ............. 455/412.2 |
| 5,999,876 A * | 12/1999 | Irons et al. .................. 701/115 |
| 6,127,947 A * | 10/2000 | Uchida et al. .............. 340/999 |
| 6,148,212 A * | 11/2000 | Park et al. ............... 455/456.1 |
| 6,163,690 A * | 12/2000 | Lilja .......................... 455/574 |
| 6,330,499 B1 | 12/2001 | Chou et al. |
| 6,370,449 B1 * | 4/2002 | Razavi et al. .................. 701/1 |
| 6,591,094 B1 * | 7/2003 | Bentley ...................... 455/405 |
| 6,604,033 B1 | 8/2003 | Banet et al. |
| 6,611,740 B2 | 8/2003 | Lowrey et al. |

* cited by examiner

*Primary Examiner*—Cong Van Tran
(74) *Attorney, Agent, or Firm*—Anthony Luke Simon

(57) ABSTRACT

The invention provides a method for accessing a quiescent mobile vehicle using a wireless communication system. A vehicle communication device is placed into a discontinuous-receive mode. The vehicle communication device is periodically awakened to a service-ready mode based on the discontinuous-receive mode. A determination is made whether a short message service communication is waiting to be delivered during the service-ready mode. A short message service communication is received in response to the short message service communication determination, and an operation is performed based on the received short message service communication.

18 Claims, 2 Drawing Sheets

METHOD AND SYSTEM FOR COMMUNICATING WITH A QUIESCENT MOBILE VEHICLE

FIELD OF THE INVENTION

This invention relates generally to data transmission over a wireless communication system. More specifically, the invention relates to a method and system for communicating with a powered-down mobile vehicle.

BACKGROUND OF THE INVENTION

Wireless communication services for mobile vehicles, such as navigation and roadside assistance, have increased rapidly in recent years. Most of the services that have been offered are for a motor vehicle in operation, but more recently, the demands and potential for services to a turned-off vehicle have grown. Services that may be requested while the vehicle is off or in a quiescent mode may include maintenance and diagnostic functions, system updates, vehicle position determination, unlocking of the doors, or vehicle alarm silencing.

Normally when the mobile vehicle is off, it is placed into a powered-down or sleep mode. A communication device and a telematics unit may also be placed into a powered-down mode for minimal power drain on the battery. To perform a requested function while the ignition is off, the vehicle may be awakened, the desired function performed, and the vehicle placed back into the sleep mode.

One method currently in use is to synchronize the wake-up time with an incoming call from a telematics or service call center. When the vehicle is awakened, a call may be received and responded to appropriately. The time period between wake-up operations may vary from ten minutes, to several days or more if the vehicle has not been moved or driven. To coordinate the wake-up function with the call from the call center, time at the call center and at the mobile vehicle may need to be synchronized. A global positioning system (GPS) unit in the mobile vehicle may provide an accurate reading of time. After the call is received and the vehicle responds, the vehicle may be put back into the sleep mode again after a predetermined duration, minimizing battery drain. Unfortunately, a prescribed, coordinated duration and wake-up schedule may not always accommodate the needs of the user or service subscriber. A vehicle in long-term parking at an airport, for example, may have been powered down for a while, but may require immediate telematic assistance when the owner returns to a vehicle with keys locked inside.

When a vehicle awakens, it may be required to register with a local wireless carrier before sending or receiving a call. In certain instances, the time required for responding to a service request or receiving communication, service or software updates for the vehicle and the communication requirements may extend beyond the predetermined awakened duration. In other situations, a call may not be able to be completed during the awakened period due to high call loads on the call center or wireless service provider. Therefore, it may be beneficial to be able to alter duration and period between wake-ups, accommodating the actual or anticipated requests.

A method is needed to make vehicle services more available even when the vehicle is powered down or turned off. This would result in increased subscriber satisfaction with the services. Increased availability of services is generally compromised by the need to maintain low power consumption.

An improved method may also ease the strain on the call center, for example, by avoiding the need for multiple call attempts to a vehicle during a wake-up period or by allowing the call attempt pattern for contacting numerous vehicles to be staggered or altered. An improved method would allow an extension of time for the vehicle to complete the requested service during the wake-up period, and an alteration of the predetermined time for initiating the wake-up period. The desirable method is one that improves the availability of a vehicle to receive and perform a service request, while maintaining low power consumption.

It is an object of this invention, therefore, to provide a method for improving the availability of a quiescent vehicle to receive and perform a service request, and to overcome the deficiencies and obstacles described above.

SUMMARY OF THE INVENTION

One aspect of the invention provides a method for accessing a quiescent mobile vehicle using a wireless communication system. A vehicle communication device may be placed into a discontinuous-receive mode. The communication device may be periodically awakened to a service-ready mode based on the discontinuous-receive mode. A determination may be made whether a short message service communication is waiting to be delivered during the service-ready mode. A short message service communication may be received in response to the short message service communication determination, and an operation may be performed based on the received short message service communication.

An operation may be performed in direct response to a request in the short message communication. The operation may include unlocking a door, unlocking a trunk, disengaging the ignition, silencing an alarm, performing an electrical test, performing a mechanical test, reading an odometer, reading a gage, performing a maintenance function, performing a diagnostic function, updating an on-board computer module, updating an on-board computer application, updating a mobile phone, and updating an on-board system.

The performed operation may include initiating a call from the vehicle communication device. The call may be made to a call center. The call made to the call center may include sending a service response.

The operation that is performed may include changing the duration of the service-ready mode. The operation may change the time period for waking the vehicle communication device to the service-ready mode. Waking the vehicle communication device may comprise a powering up of the device. The short message service communication determination may be based on a short message service request originating from a call center.

The method for accessing a quiescent mobile vehicle may include sending a short message service reply to the call center, and may also include placing the vehicle communication device into a powered-down mode.

Another aspect of the invention provides a computer usable medium including a program for accessing a quiescent mobile vehicle using a wireless communication system. The program may include computer program code for placing a vehicle communication device into a discontinuous-receive mode; computer program code for periodically waking the vehicle communication device to a service-ready mode based on the discontinuous-receive mode; computer program code for determining whether a short message service communication is waiting to be delivered during the service-ready mode; computer program code for receiving the short message service communication in response to the short message service communication determination; and computer program code for performing an operation based on the received short message service communication.

The computer usable medium also may include computer program code for sending a short message service reply to a call center, and computer program code for placing a vehicle communication device into a powered-down mode.

Another aspect of the invention provides a system for accessing a mobile vehicle including a means for placing a vehicle communication device into a discontinuous-receive mode; a means for periodically waking the vehicle communication device to a service-ready mode based on the discontinuous-receive mode; a means for determining whether a short message service communication is waiting to be delivered during the service-ready mode; a means for receiving the short message communication in response to the short message service communication determination; and a means for performing an operation based on the received short message service communication.

The mobile vehicle access system also may include a means for sending a short message service reply to a call center, and a means for placing a vehicle communication device into a powered-down mode.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
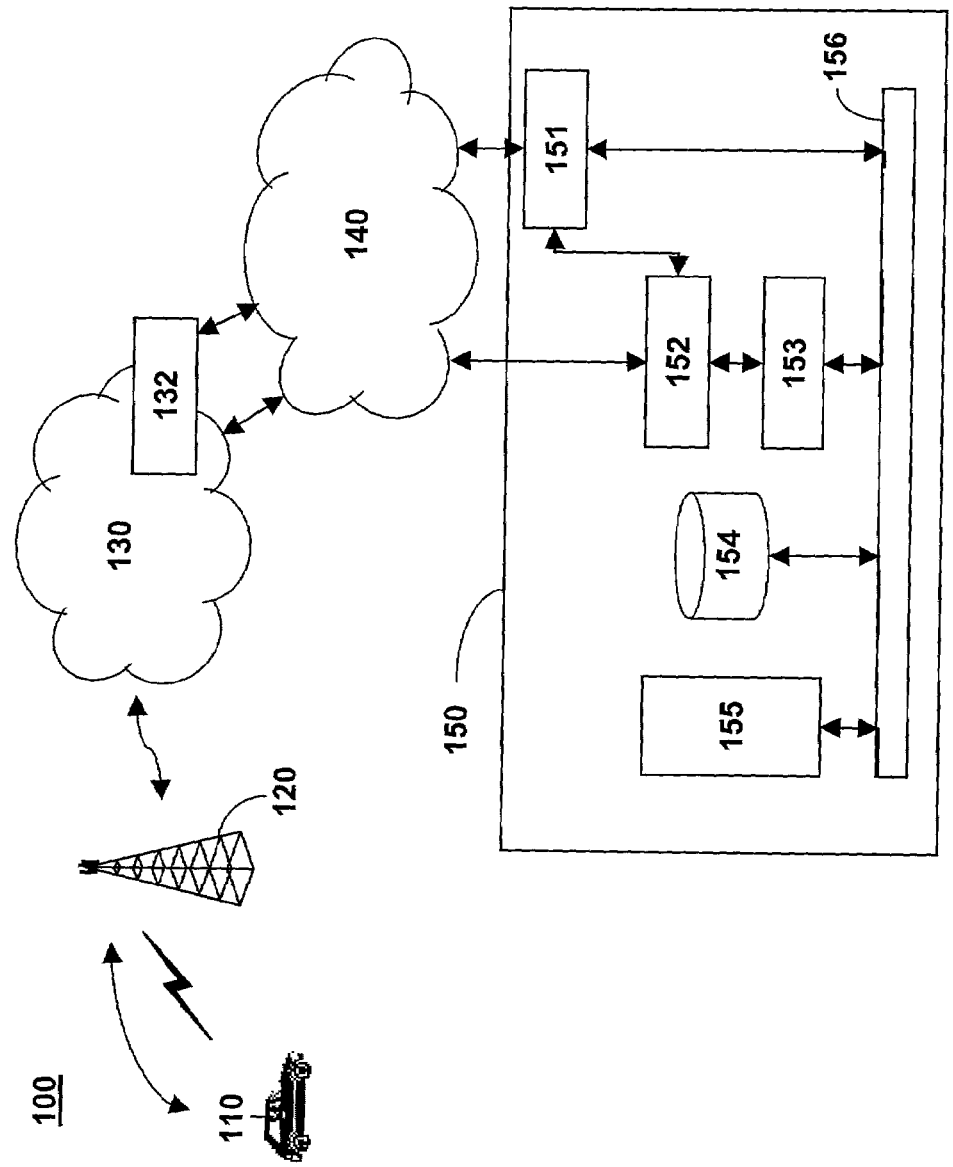
FIG. 1 is an illustration of one embodiment of a system for accessing a quiescent mobile vehicle using a wireless communication system, in accordance with the current invention.

FIG. 1 shows an illustration of one embodiment of a system for accessing a quiescent mobile vehicle using a wireless communication system, in accordance with the present invention at 100.

Mobile vehicle access system 100 may contain one or more mobile vehicles 110, one or more wireless carrier systems 120, one or more communication networks 130, one or more short message service centers 132, one or more land networks 140, and one or more call centers 150. Call center 150 may contain one or more switches 151, one or more data transmission devices 152, one or more communication services managers 153, one or more communication services databases 154, one or more advisors 155, and one or more bus systems 156.

Mobile vehicle 110 may contain a wireless vehicle communication device, such as an analog or digital phone with suitable hardware and software for transmitting and receiving data communications. Mobile vehicle 110 may contain a wireless modem for transmitting and receiving data. Mobile vehicle 110 may contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle. Mobile vehicle 110 may send to and receive radio transmissions from wireless carrier system 120.

Wireless carrier system 120 may be a wireless communications carrier. Wireless carrier system 120 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to a second mobile vehicle 110 or to a call center.

Communications network 130 may include one or more short message service centers 132. Short message service center 132 may prescribe alphanumeric short messages to and from mobile vehicles 110. Short message service center 132 may include message entry features, administrative controls, and message transmission capabilities. Short message service center 132 may store and buffer the messages. Short message services may include functional services such as paging, text messaging and message waiting notification. Short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center.

Land network 140 may connect a first wireless carrier system 120 with a second wireless carrier system 120. Communication network 130 and land network 140 may connect wireless carrier system 120 to a communication node or call center 150.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions.

The call center may contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Communication services manager 153 may send a short message service request to mobile vehicle 110.

Short message service (SMS) communications may be sent and received according to established protocols such as IS-637 standards for SMS, IS-136 air interface standards for SMS, and GSM 03.40 and 09.02 standards. These protocols allow, for example, short messages comprised of up to 160 alpha-numeric characters and may contain no images or graphics. Similar to paging, an SMS communication may be posted along with an intended recipient, such as a communication device in mobile vehicle 110. The SMS communication may be sent by a communication services manager in a call center, transferred to a short message service center (SMSC), and conveyed to the intended recipient. Mobile vehicle 110 would receive an SMS message, for example, when the ignition is on, or when put into an SMS-ready or service-ready mode while the ignition is off. A vehicle may be placed in a powered-down or quiescent mode while the ignition is off. When the mobile vehicle is placed into a service-ready mode, the phone in the mobile vehicle may register with a local wireless carrier, if needed, or with the subscriber's home system if the mobile vehicle is not roaming. If an SMS message is waiting to be sent, the wireless carrier may deliver the message and the mobile phone may acknowledge receipt of the message by an acknowledgment to the SMSC. Mobile vehicle 110 may perform an operation in response to the SMS message, and may send an SMS reply message back to the call center. Similarly, mobile vehicle 110 may originate an SMS message to the call center through the SMSC.

Communication services manager 153 may determine whether an SMS communication should be sent to mobile vehicle 110. An SMS message may be initiated, for example, in response to a subscriber request, such as a request to unlock the vehicle doors. An SMS message may be sent automatically, for example, when an update is desired or when a diagnostic message is needed. An SMS message may be sent, for example, to periodically check the location and status of mobile vehicle 110. Communication services manager 153 may provide further requests and determinations based on a reply from mobile vehicle 110. Communication services manager 153 may provide information to mobile vehicle 110 from communication services database 154.

Communication services database 154 may contain records on one or more mobile vehicles 110. A portion of communication services database 154 may be dedicated to short message services. Records in communication services database 154 may include vehicle identification, location information, status information, and recent action information regarding mobile vehicle 110. Communication services database 154 may provide information and other support to communication services manager 153.

Advisor 155 may be a real advisor or a virtual advisor. A real advisor may be a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153 or any other device connected to bus system 156.

Figure 2:
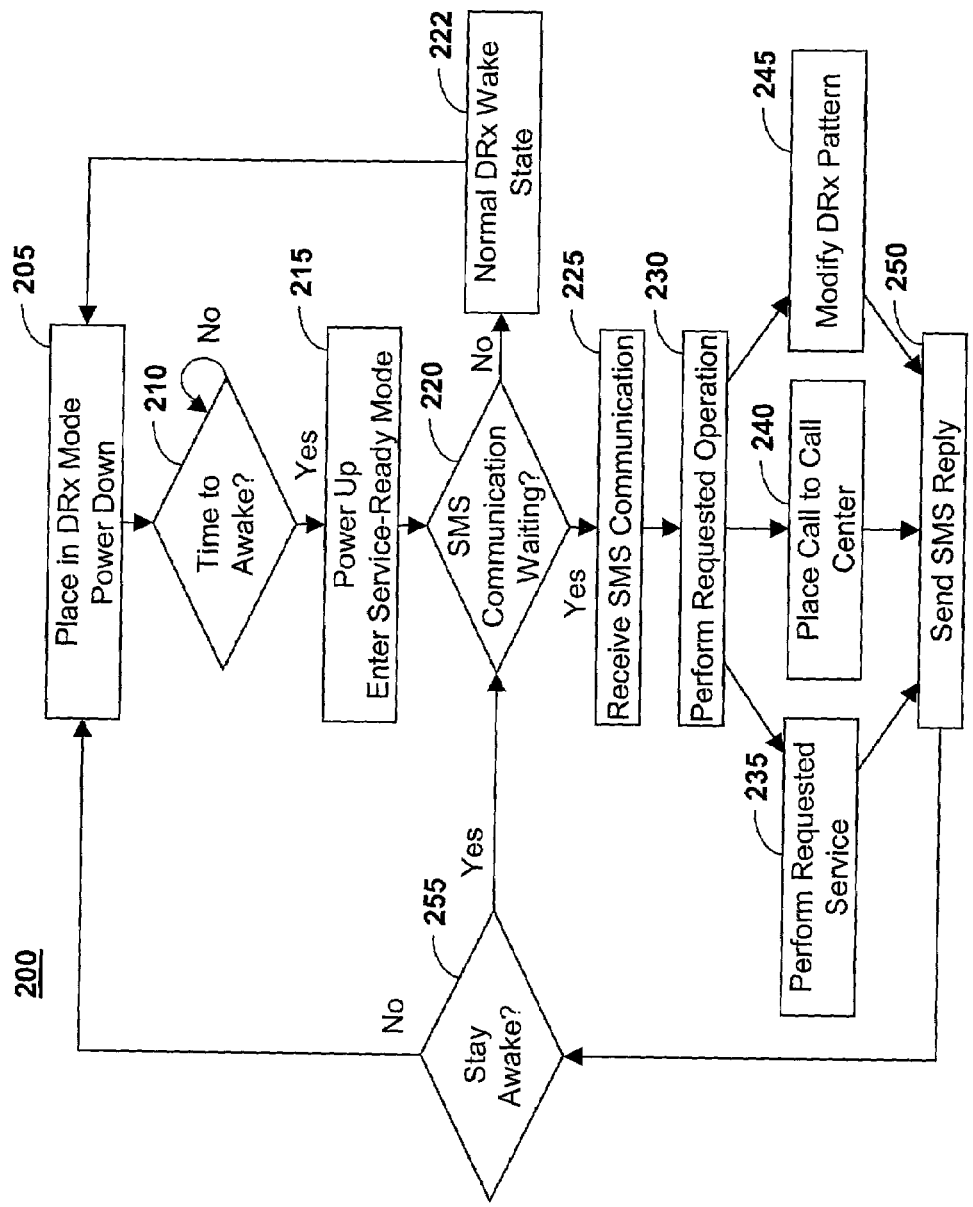
FIG. 2 is a flow diagram of one embodiment of a method for accessing a quiescent mobile vehicle using a wireless communication system, in accordance with the current invention.

FIG. 2 shows a flow diagram of one embodiment of a method for accessing a quiescent mobile vehicle using a wireless communication system, in accordance with the present invention at 200. Quiescent mobile vehicle access method 200 comprises steps to send an SMS communication to a mobile vehicle while the ignition is off, and to respond appropriately.

As seen at block 205, a mobile vehicle communication device may be placed in a discontinuous-receive (DRx) mode. The discontinuous-receive mode may include, for example, a time when the vehicle communication device is scheduled to awaken and the duration for the vehicle communication device to be awake. The discontinuous-receive mode may include storing information such as time and location at the initiation of the sleep mode. The discontinuous-receive mode may include setting a time for the next wakening period, and a duration for the next service-ready mode. The discontinuous-receive mode may also include actions to place other systems in the mobile vehicle into a quiescent or powered-down mode. The vehicle communication device may then power down. A telematics unit also may be powered down, for example. While powered down, the vehicle communication device may check an on-board clock or timer to determine if it is time to awaken, as seen at block 210.

After a period of time, the vehicle communication device may awaken or power up, as seen at block 215, and enter a service-ready mode. The service ready-mode may include powering up circuits required to receive an SMS message. The service-ready mode may also include a check to determine if an SMS communication is waiting to be sent to it, as seen at block 220. The determination may be based on a service request originating from the SMSC. The determination may be based on a service request originating from call center 150. The service-ready mode may include registering the phone if, for example, the mobile vehicle has entered a different cell phone market, or is residing in the coverage of a different base station, or has not registered recently.

If an SMS communication is not waiting to be sent to the vehicle communication device, the vehicle communication device may enter a normal discontinuous-receive (DRx) wake state, as seen at block 222, and perform actions and functions as appropriate. The vehicle communication device may return to a discontinuous-receive (DRx) mode and be powered down, as seen in 205.

If an SMS message is waiting to be sent to the vehicle communication device, the vehicle communication device may receive the SMS communication and acknowledge receipt of the message to the SMSC, as seen at block 225.

As seen at block 230, the vehicle communication device may respond to the SMS communication and perform the requested operation. The vehicle communication device may respond to an SMS communication by performing the requested service as at block 235, by initiating a call, for example, to the call center as at block 240, or by modifying its discontinuous-receive (DRx) pattern, as seen at block 245. Examples of responding directly to an SMS communication may include unlocking a door, unlocking a trunk, disengaging the ignition, silencing an alarm, performing an electrical test, performing a mechanical test, reading an odometer, reading a gage, performing a maintenance function, performing a diagnostic function, updating an on-board computer module, updating an on-board computer application, updating a mobile phone and updating an on-board system. The vehicle communication device may place a call to the call center for further communications or for data transfers that may exceed the limitations of the SMS protocol. The vehicle communication device may send, for example, the current location coordinates of the mobile vehicle to the call center from an on-board GPS unit, or a confirmation of the local time from the GPS unit. The vehicle communication device may send, for example, a service request to the call center regarding the mobile vehicle. The vehicle communication device may receive, for example, updates from the call center to alter or modify on-board systems such as the phone, modem, or diagnostic modules. The vehicle communication device may receive, for example, an update on when to awaken next, or an update regarding the duration for the next service-ready mode.

As seen at block 250, the vehicle communication device may send an SMS reply to the call center. The SMS reply may contain an acknowledgment that the requested service was completed, that a call has been made to the call center, or that the discontinuous-receive (DRx) pattern has been updated.

As seen at block 255, the vehicle communication device may stay awake based on, for example, additional time needed to perform the requested services or for responding to an additional SMS communication request. The vehicle communications device may be placed in a discontinuous receive (DRx) mode, and placed into a powered-down mode as seen at block 205.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of accessing a mobile vehicle using a wireless communication system, comprising:
   placing a vehicle communication device into a discontinuous-receive mode based on the mobile vehicle being in a quiescent mode;
   periodically waking the vehicle communication device to a service-ready mode based on the discontinuous-receive mode;
   determining whether a short message service communication is waiting to be delivered during the service-ready mode;
   receiving the short message service communication in response to the short message service communication determination; and
   performing an operation based on the received short message service communication.

2. The method of claim 1 wherein the operation performed is in direct response to a request in the short message service communication.

3. The method of claim 2 wherein the operation performed is selected from a group consisting of unlocking a door, unlocking a trunk, disengaging the ignition, silencing an alarm, performing an electrical test, performing a mechanical test, reading an odometer, reading a gage, performing a maintenance function, performing a diagnostic function, updating an on-board computer module, updating an on-board computer application, updating a mobile phone, and updating an on-board system.

4. The method of claim 1 wherein the operation performed comprises initiating a call from the vehicle communication device.

5. The method of claim 4 wherein the call is made to a call center.

6. The method of claim 5 wherein the call made to the call center comprises sending a service response.

7. The method of claim 1 wherein the operation performed comprises changing a duration of the service-ready mode.

8. The method of claim 1 wherein the operation performed comprises changing a time period for waking the vehicle communication device to the service-ready mode.

9. The method of claim 1 wherein waking the vehicle communication device comprises a powering up of the vehicle communication device.

10. The method of claim 1 wherein the short message service communication determination is based on a short message service request originating from a call center.

11. Thy method of claim 1 further comprising:
    sending a short message service reply to a call center.

12. The method of claim 1 further comprising:
    placing a vehicle communication device into a powered-down mode.

13. A computer usable medium including a program for accessing a mobile vehicle using a wireless communication system comprising:
    computer program code for placing a vehicle communication device into a discontinuous-receive mode based on the mobile vehicle being in a quiescent mode;
    computer program code for periodically waking the vehicle communication device to a service-ready mode based on the discontinuous-receive mode;
    computer program code for determining whether a short message service communication is waiting to be delivered during the service-ready mode;

computer program code for receiving the short message service communication in response to the short message service communication determination; and computer program code for performing an operation based on the received short message service communication.

14. The computer usable medium of claim 13 further comprising:

computer program code for sending a short message service reply to a call center.

15. The computer usable medium of claim 13 further comprising:

computer program code for placing a vehicle communication device into a powered-down made.

16. A mobile vehicle access system for a mobile vehicle, the system comprising:

means for placing a vehicle communication device into a discontinuous-receive mode based on the mobile vehicle being in a quiescent mode;

means for periodically waking the vehicle communication device to a service-ready mode based on the discontinuous-receive mode;

means for determining whether a short message service communication is waiting to be delivered during the service-ready mode;

means for receiving the short message service communication in response to the short message service communication determination; and means for performing an operation based on the received short message service communication.

17. The system of claim 16 further comprising:

means for sending a short message service reply to a call center.

18. The system of claim 16 further comprising:

means for placing a vehicle communication device into a powered-down mode.

* * * * *